(12) United States Patent
Baker

(10) Patent No.: US 7,815,261 B2
(45) Date of Patent: Oct. 19, 2010

(54) WHEEL COVER ASSEMBLY WITH STATIONARY AND ROTATING COVERS

(76) Inventor: Scott Baker, 5530 Kester Ave., Sherman Oaks, CA (US) 91411

( * ) Notice: Subject to any disclaimer, the term of this patent is extended or adjusted under 35 U.S.C. 154(b) by 0 days.

(21) Appl. No.: 12/217,414

(22) Filed: Jul. 3, 2008

(65) Prior Publication Data

US 2009/0008985 A1    Jan. 8, 2009

Related U.S. Application Data

(63) Continuation of application No. 11/076,493, filed on Mar. 10, 2005, now Pat. No. 7,396,087.

(51) Int. Cl.
*B60B 7/04*    (2006.01)
(52) U.S. Cl. .................. 301/37.25; 301/37.24
(58) Field of Classification Search ............ 301/37.101, 301/37.24–37.26, 37.371, 37.38
See application file for complete search history.

(56) References Cited

U.S. PATENT DOCUMENTS

| | | | | | |
|---|---|---|---|---|---|
| 2,997,344 | A | * | 8/1961 | Whiteman | ............... 301/37.25 |
| 3,722,958 | A | * | 3/1973 | Marshall | ................... 301/37.25 |
| 4,929,030 | A | * | 5/1990 | Park | ......................... 301/37.25 |
| 5,845,972 | A | * | 12/1998 | Baker | ...................... 301/37.38 |
| 6,048,036 | A | * | 4/2000 | Alaoui | .................. 301/37.376 |
| 6,517,167 | B2 | * | 2/2003 | Baker | ...................... 301/37.25 |
| 6,799,810 | B1 | * | 10/2004 | Wang | ...................... 301/37.25 |
| 6,896,334 | B1 | * | 5/2005 | Baker | ...................... 301/37.25 |
| 7,014,273 | B1 | * | 3/2006 | Yang et al. | ............... 301/37.25 |
| 7,396,087 | B1 | * | 7/2008 | Baker | ...................... 301/37.25 |

* cited by examiner

*Primary Examiner*—Jason R Bellinger
(74) *Attorney, Agent, or Firm*—Colin P. Abrahams

(57) ABSTRACT

A dual decorative assembly for a vehicle wheel combines an outer member and an inner member that are rotatably mounted on a rotatable wheel hub. Bearings carried on the inner and outer members support the members on the hub whereby the inner member may rotate in a clock-wise or counter clock-wise direction while the outer member employs weights so that the outer member remains stationary by gravitational force to downwardly depend from the bearings. The inner member includes a flared edging over-hanging the peripheral edge of the outer member. The outer member includes a variety of cut-outs and edge scalloping for decorative purposes.

2 Claims, 2 Drawing Sheets

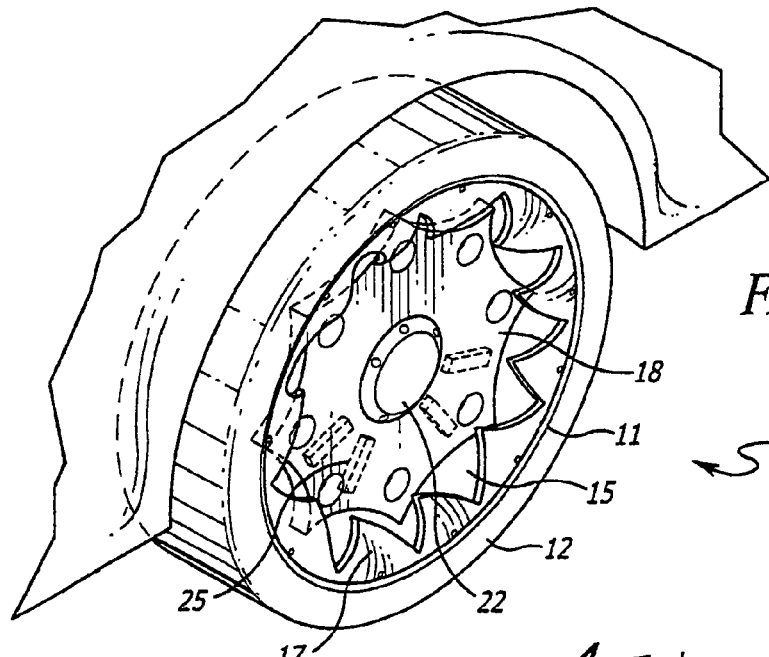
FIG. 1
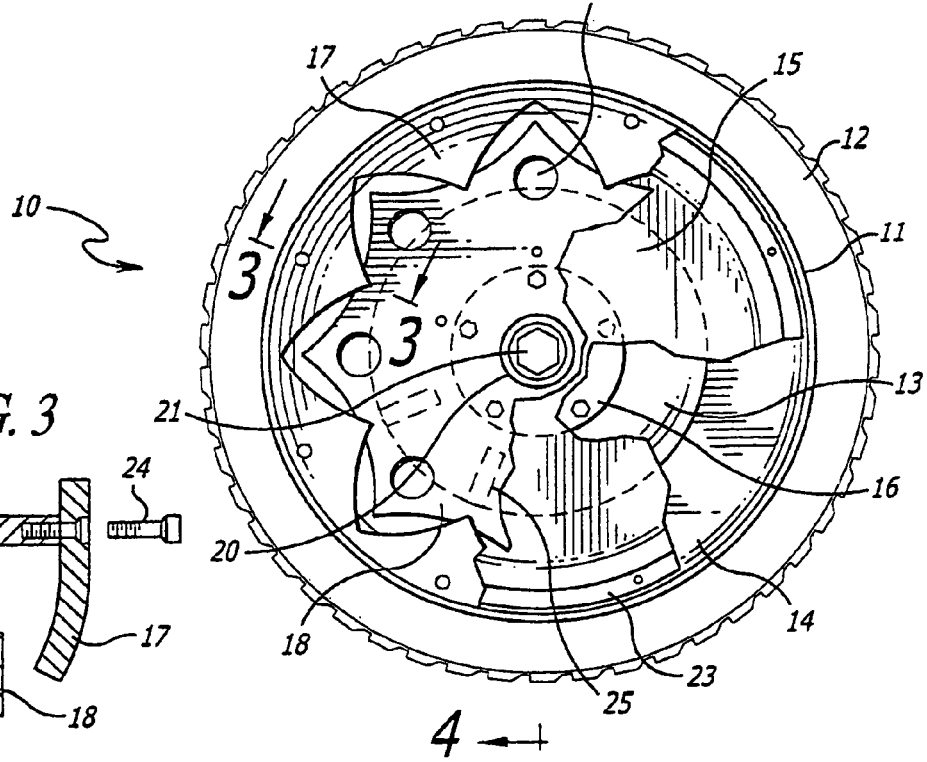
FIG. 2
FIG. 3

WHEEL COVER ASSEMBLY WITH STATIONARY AND ROTATING COVERS

CROSS REFERENCE TO RELATED APPLICATIONS

This is a continuation application of U.S. patent application Ser. No. 11/076,493, filed Mar. 10, 2005, now U.S. Pat. No. 7,396,087, incorporated herein by reference in its entirety.

BACKGROUND OF THE INVENTION

1. Field of the Invention

The present invention relates to the field of automotive wheel accessories, and more particularly to a novel wheel assembly employing interchangeable bearing mounted decorative members which freely rotate or which remain or appear static as the wheel rotates.

2. Brief Description of the Prior Art

In the past, the conventional aluminum vehicle wheel design has employed elaborate "center" decorations and designs which require removal of substantial material from the wheel itself in order to create the design. The most limiting factor to the creative expression or enhancement of the "center" of the wheel is the direct effect the design has on the strength of the wheel due to the metal removal necessary to create the design. Therefore, problems and difficulties have been encountered with employing conventional wheel design, which stem largely from the fact that the design enhancement is greatly limited due to the required removal of wheel material which then greatly weakens the strength of the wheel. Also, wheel center design appearance is generally unchangeable and requires the placement of new wheels with different designs to achieve design appearance change.

Furthermore, some prior centers for wheel visual enhancement are of an integral, non-changeable strength requiring structures fixedly secured to the wheel so as to rotate with the wheel as the vehicle mounting the wheels moves along a roadway. Thus, the variety of design and decorative options are greatly limited. For example, any wheel design center enhanced by static viewing cannot be read or understood as a wheel rotates since such indicia becomes blurred. A decorative member or cover fix to a wheel is disclosed in U.S. Pat. Nos. 5,845,972 and 6,517,167.

Also, prior wheel covers do not utilize the combined visual effect of multiple design configurations that simultaneously display a composite effect.

Therefore, a long-standing need has existed to provide a novel wheel design member or decorative member arrangement which will permit a variety of design configurations to be placed in the central area of the wheel and which may appear to be or is stationary while the wheel rotates. Strength of the wheel will not be adversely affected and interchange ability of different designs should be accommodated. The need is extended to a wheel assembly having at least one fully rotational member combined with a stationary appearing member.

SUMMARY OF THE INVENTION

Accordingly, the above problems and difficulties are avoided by the present invention which provides a wheel assembly that combines a first decorative member incorporating a given design which is rotatably mounted on a bearing so as to fully rotate in either a clockwise or counter-clockwise direction and a second decorative member incorporating a design different than the first design which is rotatably mounted on a second bearing in coaxial relationship with respect to the first bearing. The second decorative member includes a weighted means carried thereon so that the second decorative member will remain fixed or stationary while the wheel is turning as the vehicle travels along a roadway. The second stationary appearing decorative member maybe used separately or simultaneously in conjunction with the first decorative member which is freely rotatable. Therefore, the first and second decorative members are used in combination with each other so that relative movement or displacement between the two members provides a decorative and extraordinary visual effect. In one form of the invention, the first decorative member may be situated behind the second decorative member and may include an edge marginal region that is projected outwardly so as to have terminating portions residing in front of or overlapping the second decorative member beyond the edge marginal region thereof. Also, the edge marginal region of the second decorative member may include a shaped edge portion, such as a scallop configuration and/or a plurality of openings arranged in a circle about its midsection. The first and second bearings mounting the first and second decorative members are carried on a spindle outwardly projecting from a hub and a retaining bolt secures the bearings to the spindle in a releasable relationship. The hub, in turn, is bolted to the exterior side of a wheel whereby the assembly is complete.

Therefore, it is among the primary objects of the present invention to provide a novel decorative wheel assembly having a pair of decorative members in which one member is free to rotate in either a clockwise or counter-clockwise direction and the other decorative member remains static or stationary while the wheel is permitted to rotate.

Another object of the present invention is to provide a decorative wheel assembly which will permit quick interchangeability of dual decorative members.

Still a further object of the invention is to provide a novel wheel assembly which has a mounting for a pair of decorative members, permitting interchangeability of either member and which provides for at least one decorative member of the pair to be static while the wheel turns and where the other decorative member is rotatably mounted to freely spin.

A further object resides in providing a wheel assembly having a mounting assembly for a pair of decorative members wherein one member is free to rotate clockwise or counter-clockwise while other decorative member remains in a static or stationary orientation as the wheel turns.

Still another object includes a wheel assembly having a pair of decorative members movably mounted on a rotatable wheel wherein different design configurations are incorporated into each member whereby the design configurations compliment each other as the wheel rotates or remains stationary.

Another object resides in providing dual wheel design configurations which interact to provide a combined visual enhancement.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description taken in connection with the accompanying drawings in which:

FIG. 1 is a front perspective view illustrating the novel wheel assembly of the present invention having a first decorative member freely rotatable and a second decorative member adapted to be in a static or stationary position during wheel rotation;

FIG. 2 is a front elevational view of the wheel assembly shown in FIG. 1 having portions broken away to illustrate the assembly arrangement of components;

FIG. 3 is an enlarged fragmentary sectional view taken in the direction of arrows 3-3 of FIG. 2.

DESCRIPTION OF PREFERRED EMBODIMENT

Figure 4:
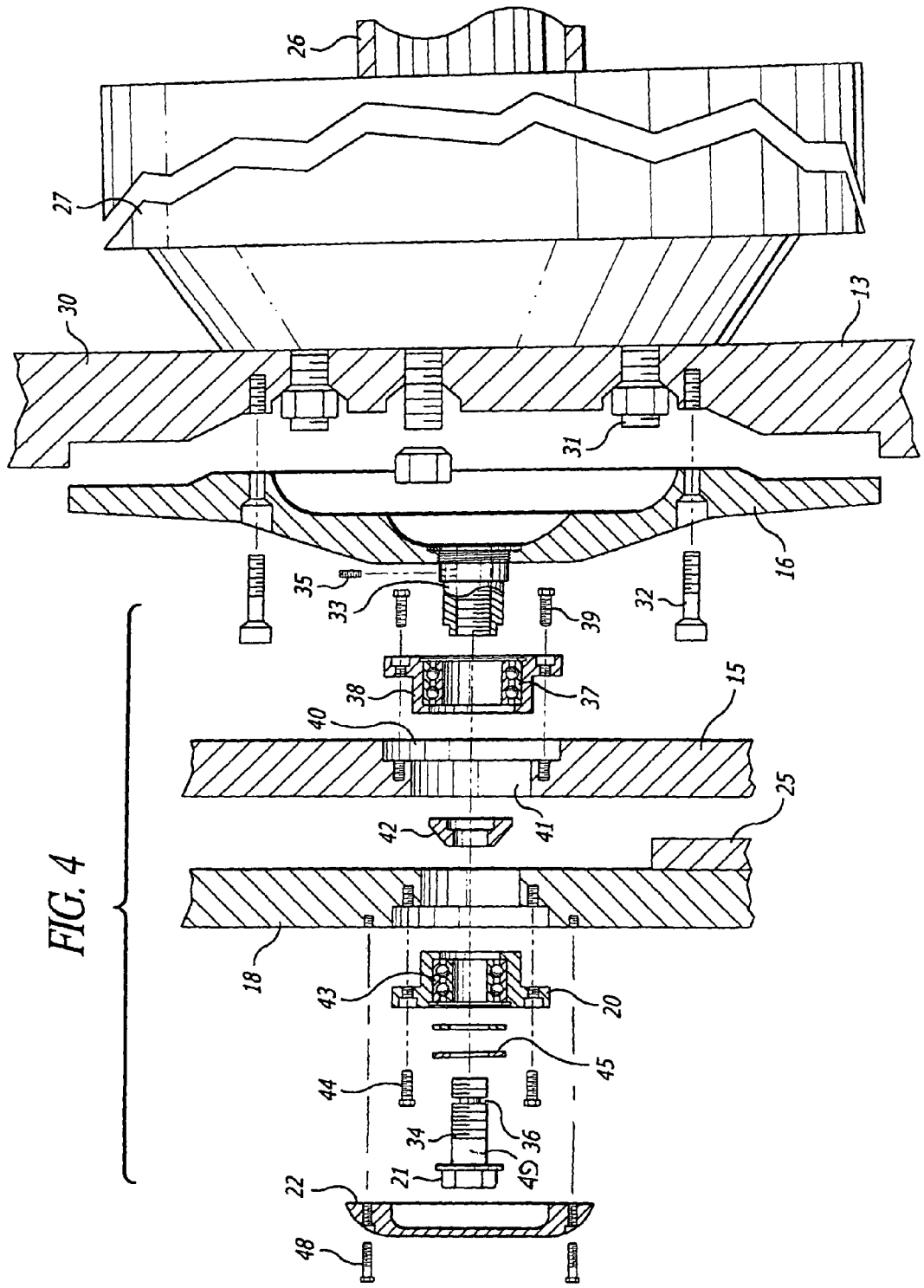
FIG. 4 is an exploded transverse cross—sectional view of components of the wheel assembly illustrating the dual mounting for the pair of decorative members.

Referring now in detail to FIGS. 1 and 2, the novel wheel assembly is illustrated in the general direction of arrow 10 which illustrates the assembly mounted on a conventional wheel with a rim 11 on which a conventional tire 12 is mounted. The wheel further includes a central area, indicated by numeral 13, and the central area is integrally formed with a skirt area 14. A first or inner decorative member 15 is rotatably carried on a bearing 37, shown in FIG. 4, mounted on a spindle 33 carried on a hub 16 so that the first or inner decorative member 15 is free to rotate in a clockwise or counter-clockwise direction. The first or inner decorative member is of sufficient diameter to substantially cover the central area 13 and the skirt area 14 of the wheel. The upper peripheral edge marginal region of the first decorative member includes a portion folded over to terminate in a plurality of shaped segments, such as the triangular shaped segment identified by numeral 17. The plurality of segments are outwardly spaced from the opposing surface of the first decorative member so as to provide a space for movably accommodating rotation of a second or outer decorative member 18. This latter decorative member is rotatably mounted on a second bearing 43 which is coaxially disposed with respect to the bearing 37 mounting the first or inner decorative member 15 Therefore, the edge marginal region of the second or outer decorative member 18 can move or rotate between the opposing surfaces of the plurality of segments 17 and the main body of the first or inner decorative member 15. Also, it is to be noted that the configuration of the second or outer decorative member includes a scalloped peripheral edge which is of a design configuration different from that of the first or inner decorative member. The second or outer decorative member may also include further decorative features, such as a plurality of openings 52 arranged in a circle about the midsection of the member so as to be coaxial with bearing 43. The assembly is held together by a removable retainer bolt 21 that threads through a mounting spindle 33, shown in FIG. 4, on which the first and second bearings are mounted. A cap 22 covers the retaining bolt 21 and completes the mounting of the assembly.

Referring now in detail to FIGS. 2 and 3, it can be seen that the peripheral edge marginal region of the first or inner decorative member 15 may include an outwardly extending flange 23 and that the plurality of segments 17 or individual integral segments may be coupled thereto by means of screws, such as screw 24. Therefore, it is to be understood that the first or inner decorative member may include the added feature of the plurality of segments or, if desired, the segments can be omitted and the first or inner decorative member can be otherwise decorated.

It can also be seen in FIGS. 1 and 2 that the second or outer decorative member 18 includes a plurality of weights or even a single weight, such as weight 25, which will maintain the member 18 in a static position while the first or inner decorative member 15 rotates in either a clockwise or counter-clockwise direction. The weighted second or outer decorative member 18 remains in a static position as the wheel rotates because of the mounting of the member to the spindle 33 in hub 16 by means of a bearing 43.

Referring now in detail to FIG. 4, an axle 26 connected to a drive train terminates with a brake drum 27. A plurality of wheel lug spindles and nuts outwardly project from the brake drum and retain a wheel 30 thereon. The spindle and nut of the plurality is indicated by numeral 31. The hub 16 is attached to the central area 13 of the wheel by a plurality of hub mounting bolts, such as bolt 32. It is to be particularly noted that the hub 16 includes an outwardly projecting mounting spindle 33 which has an internal threaded bore adapted to receive the threaded shank 34 on the retainer bolt 21. Once the bolt is fully engaged with the mounting spindle, a set screw 35 is introduced through the base of the mounting spindle so as to have its terminal end engage in slot 36 of the threaded shank 34 of bolt 21. The mounting spindle 33 passes through the bore of an inner race of a bearing 37 wherein the outer race of the bearing is held in a housing 38 that is attached to the backside of the first or inner decorative member 15 by screws, such as screw 39. The mounting flange for the bearing housing is recessed within a recess 40 while the body of the housing is nested in a recess 41 of the member 15. A conical fitting 42 is carried on the distal end of the mounting spindle 33 and engages with a tapered opening in the bearing housing 20 which is carried on the second or outer decorative member 18. The bearing is identified by numeral 43 and screws, such as screw 44, retain the bearing housing 20 onto the outer face of member 18. The inner race of bearing 43 is fitted up to the fitting 42 and includes a central passageway through which the threaded shank 34 of retaining bolt 21 passes. The inner race mounts on a base 49 of the threaded shank. A pair of washers, such as washer 45, are disposed between the head of the retaining bolt 21 and the inner race of bearing 43. The weight 25 is illustrated on the backside of the second or outer decorative member 18 and it is to be understood that a single weight or multiple weights disbursed in fixed spaced-apart relationship maybe employed.

The cap 22 is placed over the retaining bolt 21 and is detachably connected to the outer face of member 18 by a plurality of screws, such as screw 48. It is to be particularly noted that the longitudinal axis of the assembly about which the members 15 and 18 rotate are common and this is achieved by placing the retaining bolt 21, bearings 43 and 37, members 18 and 15, mounting spindle 33, are all lying on the central longitudinal axis of the assembly which, in turn, lies along the central axis of the axle 26.

In view of the foregoing, it can be seen that as the axle 26 is driven to rotate, the wheel 30 will rotate and the first or inner decorative member 15 is free to rotate in either a clockwise or counter-clockwise direction quite freely. The second or outer decorative member 18 is rotatably mounted by its bearing so as to rotate but is induced not to rotate because of the eccentric weight arrangement set up by weight 25. Therefore as the wheel 30 rotates, member 15 may spin in either direction while the member 18 remains static as the vehicle travels along a roadway.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A decorative assembly for mounting on a rotatable wheel comprising:
   a hub attached to said wheel;
   a first decorative member rotatably carried on said hub;
   a second decorative member rotatably carried on said hub;
   attachment means including an outwardly projecting spindle rotatably mounting said first decorative member and said second decorative member in a coaxial relationship providing an independent rotational relationship therebetween; and
   said second decorative member is weighted so as to remain stationary due to gravitational force as said wheel rotates;
   a first bearing carried on the first decorative member and supported on the spindle, the first decorative member being mounted on the spindle immediately adjacent the hub;
   a second bearing carried on the second decorative member and supported on the spindle in coaxial relationship with respect to the first bearing, the second decorative member being mounted on the spindle with the first decorative member in between the second decorative member and the hub; and
   a retainer fastener engageable with said spindle for releasably retaining said first and said second decorative members on said spindle;
   the second decorative member having a peripheral edge, and the first decorative member having a peripheral edge marginal region adjacent the peripheral edge of the second decorative member and in spaced-apart relationship thereto, the peripheral edge marginal region of the first decorative member being a separate decorative element, and a fastener means securing the decorative element with the edge marginal region of the first decorative member;
   the first and second bearing coaxially mounting the first and the second decorative members on the spindle; and
   the second decorative member includes a weighted means secured to a selected area thereon so as to be eccentric with respect to a turning axis of the first or second bearing.

2. The decorative assembly as defined in claim 1 including:
   a conical fitting carried on a distal end of said spindle and engageable with said second bearing.

\* \* \* \* \*